(12) United States Patent
Li et al.

(10) Patent No.: US 9,774,356 B2
(45) Date of Patent: Sep. 26, 2017

(54) METHOD AND APPARATUS RELATING TO RECEPTION OF RADIO SIGNALS

(71) Applicant: Telefonaktiebolaget LM Ericsson (publ), Stockholm (SE)

(72) Inventors: Ming Li, Beijing (CN); Youping Su, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 28 days.

(21) Appl. No.: 14/906,467

(22) PCT Filed: Jul. 24, 2013

(86) PCT No.: PCT/CN2013/079944
§ 371 (c)(1),
(2) Date: Jan. 20, 2016

(87) PCT Pub. No.: WO2015/010263
PCT Pub. Date: Jan. 29, 2015

(65) Prior Publication Data
US 2016/0164557 A1   Jun. 9, 2016

(51) Int. Cl.
H04B 1/10    (2006.01)
(52) U.S. Cl.
CPC ... H04B 1/1036 (2013.01); *H04B 2001/1063* (2013.01)
(58) Field of Classification Search
CPC ........ H04B 1/1036; H04B 1/109; H04B 1/26; H04B 1/10; H04B 1/1027; H04B 2203/5441
USPC ... 455/307, 296, 318, 339, 63.1, 114.2, 324, 455/500, 517, 422.1, 403, 426.1, 426.2; 375/316, 346
See application file for complete search history.

(56) References Cited

U.S. PATENT DOCUMENTS

| | | | |
|---|---|---|---|
| 2003/0207669 A1 | 11/2003 | Kroeger | |
| 2009/0298522 A1 | 12/2009 | Chaudhri et al. | |
| 2014/0185718 A1* | 7/2014 | Ruelke | H04N 21/42638 375/345 |

FOREIGN PATENT DOCUMENTS

| CN | 101132493 A | 2/2008 |
|---|---|---|
| CN | 101257465 A | 9/2008 |
| CN | 102187586 A | 9/2011 |

(Continued)

*Primary Examiner* — Keith Ferguson
(74) *Attorney, Agent, or Firm* — Murphy, Bilak & Homiller, PLLC (57) ABSTRACT

Method and multi carrier receiver for removing interference from a RF-signal. In a multi carrier receiver with a heterodyne receiver structure, the RF-signal is received from a multi carrier transmitting entity. The RF-signal comprises a data part an interference part. The interference part is detected by means of the interference unit, and a frequency and a power level of the interference part is determined. A frequency of a first LO is adjusted, such that an output signal of a first mixer is frequency shifted towards an upper edge or a lower edge of a first IF bandpass filter when the determined power level exceeds a predetermined threshold. By detecting an interference part of an incoming RF-signal and controlling a local oscillator based on the detected interference, an effective and flexible solution is achieved for removing interference from the RF-signal.

22 Claims, 9 Drawing Sheets (56) References Cited

FOREIGN PATENT DOCUMENTS

| CN | 102870333 | A | 1/2013 |
|---|---|---|---|
| EP | 2106029 | A1 | 9/2009 |

* cited by examiner

METHOD AND APPARATUS RELATING TO RECEPTION OF RADIO SIGNALS

TECHNICAL FIELD

The present disclosure relates to removal of an interference part of RF (Radio Frequency) signals in communication systems, especially it relates to filtering out the interference part in multi carrier receiving entities comprising heterodyne receiver structures.

BACKGROUND

In wireless communication networks, UEs (User Equipments), communicate data via radio base stations.

In this description, the term "User Equipment" will be used to denote any suitable communication terminal adapted to communicate with a radio base station. A UE may be implemented as a mobile phone, a PDA (Personal Digital Assistant), a handheld computer, a laptop computer, etc. A "radio base station" may be implanted as a NodeB, an eNodeB, a repeater, etc.

In "heterodyne" receiver structures, an incoming RF-signal is fed into a first input of a mixer where it is mixed with a local oscillator (LO) frequency which is fed into a second input of the mixer. The mixer output is a down-converted version of the RF-signal of an intermediate frequency, where the LO frequency is removed from the incoming RF-signal, i.e. the RF-signal spectrum is transferred into an IF (Intermediate Frequency) spectrum.

In double conversion systems, which are common today, a received RF-signal spectrum is frequency converted in two steps before the signal is fed into a receiver arrangement. First the received RF-signal is frequency converted from a RF frequency range into a lower first IF frequency range, and then the first IF frequency range is frequency converted into a second IF frequency range, before being A/D (Analogue-to-Digital) converted and fed into the receiver arrangement.

Figure 1:
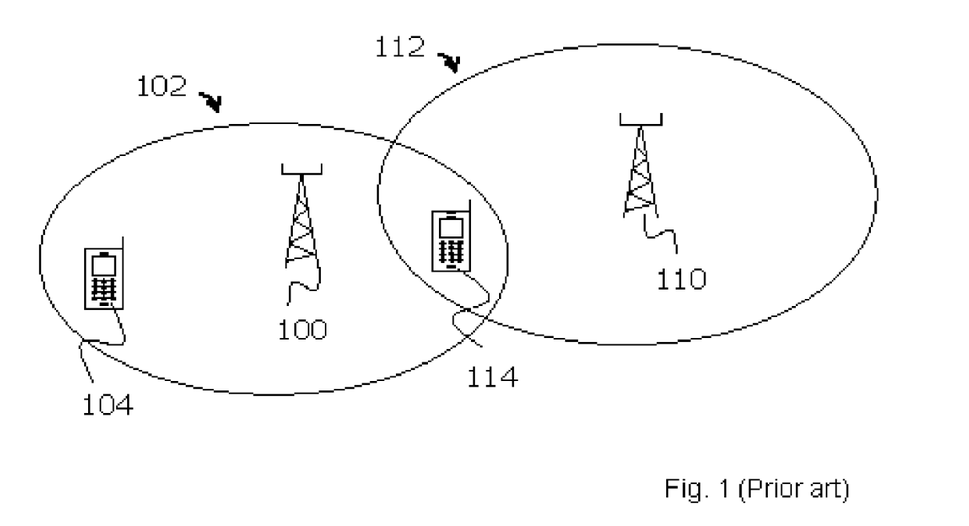
FIG. 1 is a schematic environmental illustration of an arrangement, according to the prior art.

With reference to FIG. 1, which is a schematic overview, a situation where UEs are arranged to communicate data in a wireless communication network according to the prior art will now be described.

A first UE 104 is present in a first cell 102 of a wireless communication network. The first UE 104 communicates data with a first radio base station 100 which serves the cell 102. A second UE 114 is present in a second cell 112 of the wireless communication network. Correspondingly, the second UE 114 communicates data with a second radio base station 110 which serves the second cell 112.

In general, in cellular communication networks the cells overlap each other, especially at the cell borders. There are situations where UEs are located closer to other radio base stations than the UEs which these other radio base stations are communicating data with. The radiation emitted from such a UE may reach a "wrong" radio base station, to which this emitted radiation is an interfering disturbance.

In the situation described above with reference to FIG. 1, the UE 114 is communicating data with the radio base station 110. However, since the UE 114 is located closer to the radio base station 100 then the UE 104 which communicates with the radio base station 100, the emitted signal from the UE 114 that reaches the radio base station 100 could be stronger than the emitted signal from the UE 104. This is especially the situation when the UEs are located near the cell borders, and the power level of the emitted radiation of the UE 114 is high. The emitted radiation from the UE 114 which reaches the radio base station 100 is perceived as interference noise by the first base station 100, and because the UE 114 is located much closer to the radio base station 100 than the UE 104 the interference signal may be much stronger then the data signal of the UE 104.

In heterodyne receiver arrangements of wireless communication networks, received RF-signals are commonly frequency converted in two steps before being A/D-converted (Analogue to Digital) into a base band, so called double conversion. The received RF-signals are then mixed with an output signal of an RF LO into an Intermediate Frequency (IF) signal in a first step. Then, in a second step, the IF-signal is mixed with an output signal of an IF LO into a second IF-signal.

Figure 2:
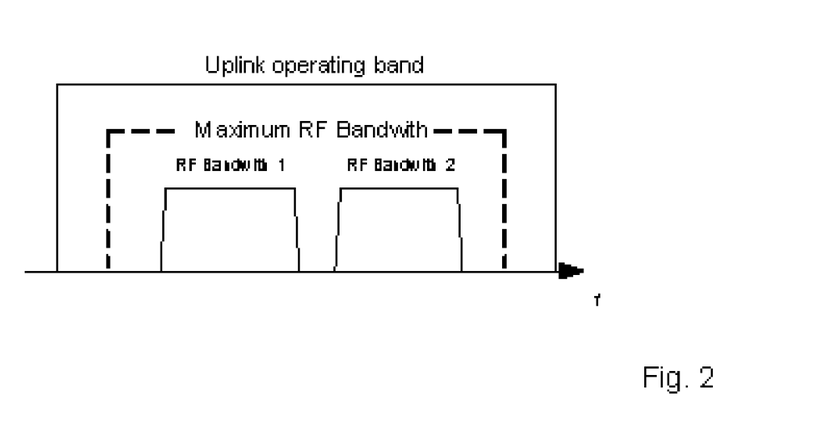
FIG. 2 is a schematic graph of frequency ranges, according to the prior art.

With reference to FIG. 2, which is a schematic graph, some definitions of bandwidths will now be described in accordance with the prior art.

When communicating data in uplink UL (uplink) operating bands are reserved, e.g. the frequency range 1850-1910 MHz is reserved by the 3GPP (Third generation partnership project) for UL transmission. However, all base stations and UEs are not capable to make use of the full UL operating band when communicating. In general, a maximum RF (Radio Frequency) bandwidth which is able to apply for a BS when communicating with a UE is narrower or equal with the UL operating bandwidth. The maximum RF bandwidth is also referred to as IBW (Instantaneous Bandwidth) within literature. For a receiver, the width of IF filter passband are normally same as IBW to provide good rejection to interference. In multi carrier base stations and UEs, a number of carriers are contained within the maximum RF bandwidth. For instance, as illustrated in FIG. 2, a maximum RF bandwidth of 60 MHz, may contain 2 carriers of 20 MHz each. In this case, the RF bandwidth, which is from lower edge of carrier 1 to higher edge of carrier 2, is narrower than IBW.

There is a problem that base stations are affected by interfering RF-signals from other radio base stations or UEs, and there is a need for more robust receiver arrangements.

SUMMARY

It would be desirable to obtain improved performance in multi carrier receiving entities. It is an object of this disclosure to address at least some of the issues outlined above.

Further, it is an object to provide a mechanism for interference reduction for communication in wireless communication networks. These objects may be met by a method and an arrangement according to the attached independent claims.

According to one aspect, a method performed by a multi carrier receiving entity for reception of a RF (Radio frequency) signal is provided, where said multi carrier receiving entity comprises a heterodyne receiver structure with a first mixer, a first LO (Local Oscillator), and a first IF (Intermediate Frequency) bandpass filter. In the method, by means of a receiver unit and by means of an interference receiver unit the RF-signal is received from a transmitting entity. The RF-signal comprising a data part and an interference part. Furthermore, the interference part is detected by means of the interference unit, and a frequency and a power level of the interference part is determined. A frequency of the first LO is adjusted, such that an output signal of the first mixer is frequency shifted towards an upper edge or a lower edge of the first IF bandpass filter when the determined power level exceeds a predetermined threshold. Moreover, the interference part of the RF-signal may be detected by mixing the received RF-signal with a frequency of an interference receiver LO by means of the interference receiver unit, converting a resulting signal of the mixing into a frequency domain, and filtering the converted signal by a notch filter such that the data part is excluded from the interference part.

According to another aspect, a multi carrier receiving entity is provided for receiving an RF-signal. The multi carrier receiving entity comprises a heterodyne receiver structure with a first mixer, a first LO and a first IF bandpass filter. The multi carrier receiving entity comprises further a receiving unit and an interference receiving unit, which both are adapted to receive the RF-signal from a transmitting entity. The RF-signal comprises a data part and an interference part. The interference receiving unit is further adapted to detect the interference part and determining a power level and a frequency of the interference part, and the multi carrier receiving entity is further adapted to adjust a frequency of the first LO when the determined power level exceeds the predetermined threshold, such that an output signal of the first mixer is frequency shifted towards an upper edge or a lower edge of the first IF bandpass filter.

Furthermore, the multi carrier receiving entity may further comprise a notch filter, and be further adapted to detect the interference part by mixing, by means of the interference receiver unit, the received RF-signal with a frequency of an interference receiver LO, the interference receiver LO comprised in the interference receiver unit, converting, by means of the interference receiver unit the resulting signal of the mixing into a frequency domain, and filtering the frequency domain by the notch filter such that the data part is excluded from the interference part.

By detecting an interference part of an incoming RF-signal and controlling a local oscillator based on the detected interference, a frequency spectrum of an intermediate frequency spectrum may be frequency shifted towards an edge of an intermediate frequency bandpass filter. Thereby the intermediate frequency spectrum may be matched to the intermediate frequency bandpass filter, such that the interference part may be removed from the RF-signal. Thus, a flexible solution to remove interference by applying a fixed filter may therefore be achieved.

BRIEF DESCRIPTION OF DRAWINGS

The solution will now be described in more detail by means of exemplary embodiments and with reference to the accompanying drawings, in which.

DETAILED DESCRIPTION

Figure 5A:
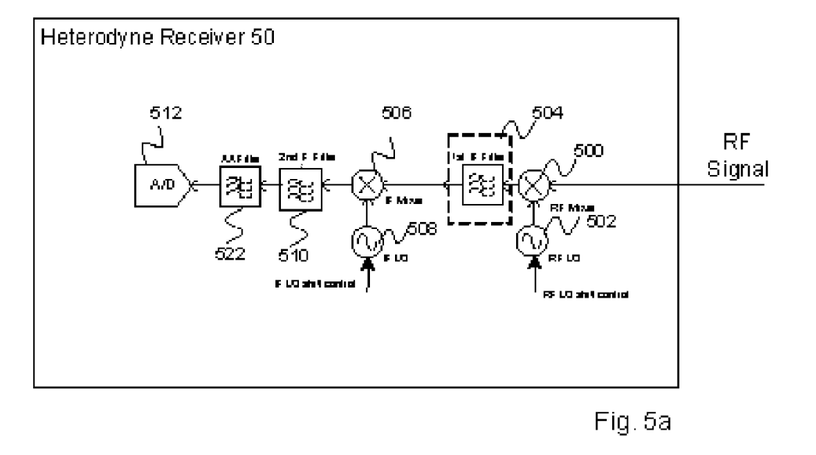
FIGS. 5*a-b* are schematic block diagrams of arrangements in a multi carrier receiving entity, according to possible embodiments.
Figure 5B:
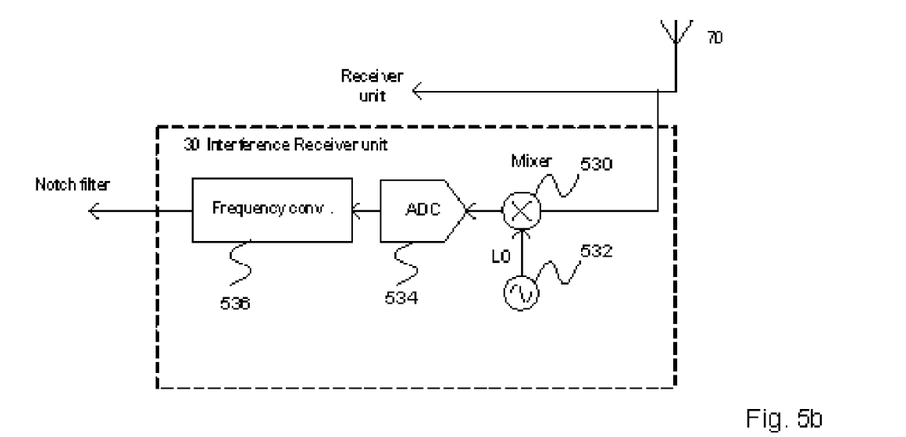

In multiple carrier receiver structures applying double conversion, an RF (Radio Frequency) signal which comprises a data part and an interference part will be down-converted into a first IF (Intermediate Frequency) range before being down-converted into a second lower IF range. By frequency adjusting at least one of an RF LO (local oscillator) 502 and an IF LO 508, the outputs of the respective RF mixer 500 and IF mixer 506 may be frequency shifted, towards an edge of a following respective first IF bandpass filter 504 or a second IF bandpass filter 510 or low pass filter, such that the interference part could be separated from the data part and the interference part could be removed. Furthermore, by simultaneously receiving the RF-signal on an interference receiver unit 30 and a heterodyne receiver unit 50, the interference part could be detected and appropriate control signals to an RF LO 502 and an IF LO 508 could be set. The control signals will then be applied to control the RF LO 502 and the IF LO 508 such that the outputs of the RF mixer 500 and the IF mixer 506 could be frequency shifted.

Figure 3A:
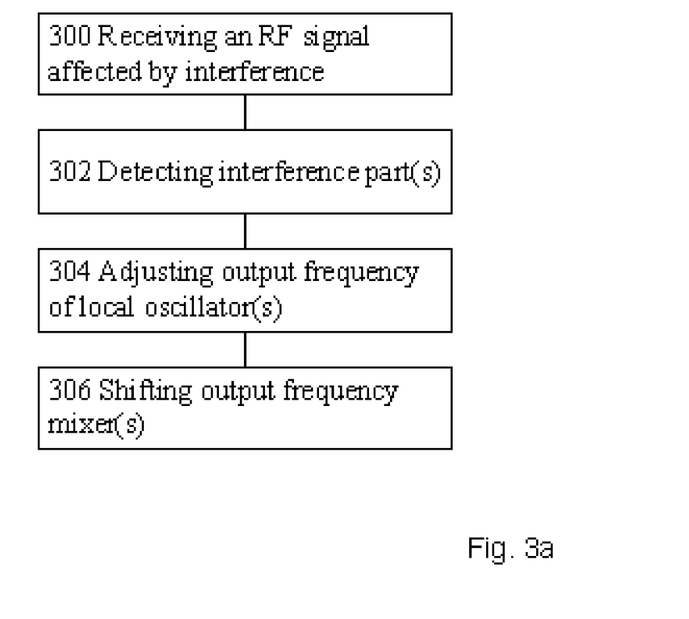
FIGS. 3*a-b* are schematic flowcharts of methods, according to possible embodiments.
Figure 3B:
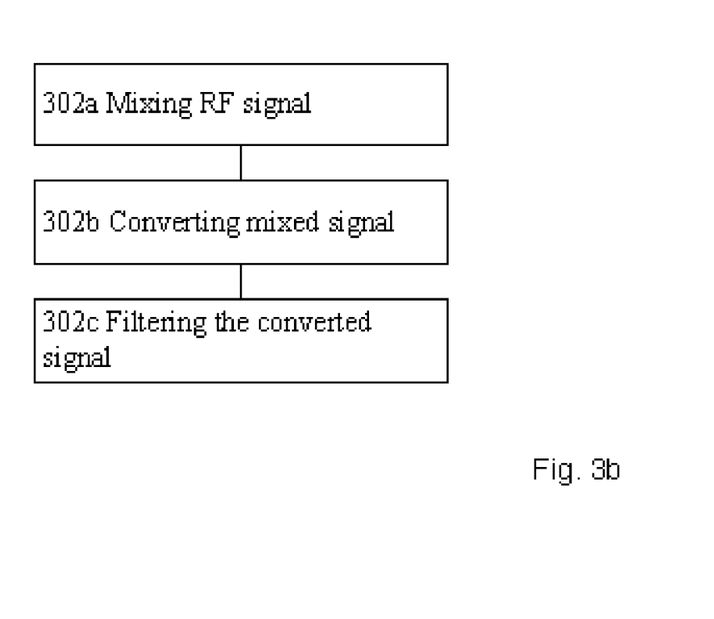

With reference to FIG. 3, which is a schematic flowchart, a method performed by a multi carrier receiver will now be described in accordance with one exemplifying embodiment.

The multi carrier receiver is located in a wireless communication network and is arranged to receive uplink data from a plurality of UEs. In this exemplifying embodiment the multi carrier is implemented as an eNodeB, i.e. a radio base station of an LTE (Long Term Evolution) wireless communication network. However, the concept that will be described is not limited thereto. It is to be noted that any other suitable radio base station, e.g. a NodeB, a GSM radio base station or a WiMax radio base station may operate according to the concept.

In a first action 300, the eNodeB receives an RF-signal which is affected by interference from a UE, a radio base station or its own transmitter leakage. The interference can originate from other UEs which are not served by the UE communicating with the eNodeB. The received RF-signal comprises a data part, and an interference part, where the data part is uplink data from the UE and the interference part could be other data which is not directed to the UE. The received RF-signal is fed to a heterodyne receiver in the eNodeB but is also simultaneously fed to an interference receiver unit, which is arranged to detect and determine a power level and a frequency spectrum of the interference part.

In a subsequent action 302, the eNodeB detects the interference part in order to analyse the interference and to enabling the heterodyne receiver to separate the data part from the interference part and remove the interference part. The eNodeB determines a power level and a frequency range of the interference parts.

In a following action 304, based on that the power level of the interference part exceeds a predetermined threshold, an output frequency of an RF LO or an output frequency of an IF LO is adjusted, by decreasing or increasing the output frequency of the RF LO or IF LO in relation to the respective interference frequencies.

Since the output frequency of the RF LO or the output frequency of the IF LO are adjusted, the output frequency of the respective RF mixer or the output frequency of the respective IF mixer is shifted in a final action 306.

The eNodeB is capable to decide which output frequency of the RF LO and the IF LO that will be adjusted and whether the output frequencies will be increased or decreased.

In another exemplifying embodiment which is based on the one described above, the eNodeB will further, when determining the power level and the frequency range of the interference part and in parallel with feeding the RF-signal to the heterodyne receiver, mix the received RF-signal with an output frequency of the RF LO before filtering the output signal of the RF LO and feed into a notch filter. The notch filter will then remove the data part, such that the interference part could be analysed.

Figure 4:
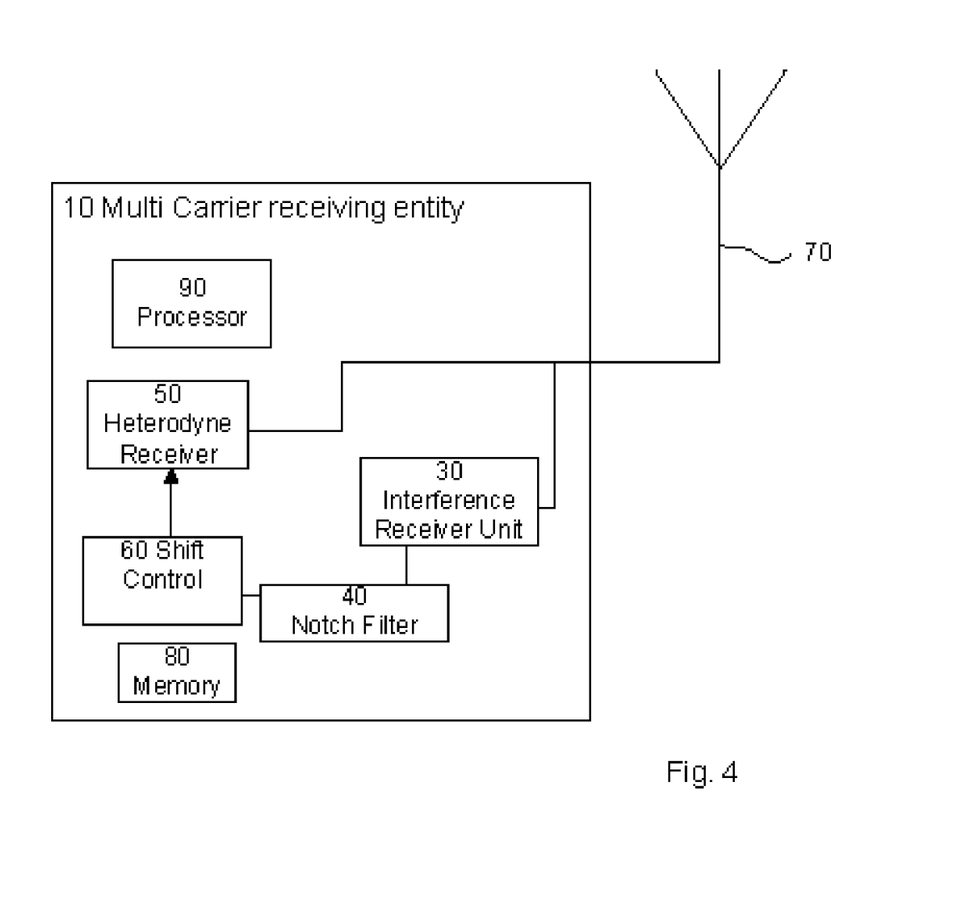
FIG. 4 is a schematic block diagram of a multi carrier receiving entity, according to possible embodiments.

With reference to FIG. 4, which is a schematic block diagram, a multi carrier receiving entity 10 will now be described in accordance with one exemplifying embodiment.

In this exemplifying embodiment, the multi carrier receiving entity is implemented as a multi carrier base station 10 arranged to receive RF-signals in Uplink from a plurality of UEs (not shown).

The multi carrier base station 10 comprises a heterodyne receiver unit 50 and an interference receiver unit 30, which are arranged to simultaneously receive an RF-signal from a UE via an antenna 70. Furthermore, the multi carrier base station 10 comprises a notch filter 40, a processor 90 and a memory 80. The received RF-signal comprises a data part and an interference part. The data part comprises the uplink data from the UE, i.e. a "wanted" uplink signal, and the interference part comprises other RF-signals which reaches the antenna 70. For instance, the interference part may comprise RF-signals from other UEs which communicate with other radio base stations, but are located close to the multi carrier base station 10, or from other radio base stations, or RF-signals originating from transmitting performed by the multi carrier base station 10 itself, so called transmitter leakage which is also denoted as TX leakage.

As stated above, in the heterodyne receiver 50 the incoming RF-signal is down converted to an IF-signal before being A/D-converted into a digital baseband signal. In the interference receiver 30, the incoming RF-signal will be mixed by a mixer together with an LO frequency, resulting in an IF-signal. The LO frequency in interference receiver 30 is a fixed frequency, i.e. the frequency of the this LO will not be adjusted. The output signal of the interference receiving unit 30 is fed into a notch filter 40, which is adapted to remove the data part of the IF-version of the received RF-signal. The remaining IF-signal after removal is fed into the shift control unit 60 to detect the interference and determine a power level and a frequency of the interference part. The shift control unit 60 compares the determined power level and will adjust the local frequency an LO (local oscillator) of the heterodyne transceiver, when the power level of the interference part is above an appropriate level. As will be disclosed in more detail below, the IF version of the received RF-signal is then frequency shifted towards an edge of a IF-filter which will filter out the interference part from the data part, i.e. remove the interference part, such that the frequency spectrum of the IF-version increases of decreases. By frequency shifting the full IF-version in a suitable frequency direction, the IF-version will be adjusted according to an IF-filter, such that the IF-filter is enabled to remove the interference part of the IF-version of the RF-signal.

By determining the interference part of the IF-signal and frequency shifting the full IF-spectra the heterodyne receiver 50 is enabled to remove the interference part without adjusting the IF filter. Adjusting analog filters is a slow and inflexible process, which could be avoided with the described solution. By instead frequency shifting the IF-signal a more efficient solution for removing interference will be achieved.

By detecting a interfering RF-signal, which is received via the antenna 70, and determining a power level and a frequency of the interfering RF-signal, the heterodyne receiver 50 is enabled to frequency shift the IF-signal towards an appropriate edge of the IF-filter, such that the IF filter may filter out the interference part of the received RF-signal.

In addition, the described multi carrier base station 10 may comprise a memory 80 which is adapted to store information regarding various control parameters, e.g. as the RF bandwidth of the multi carrier base station 10 and the maximum RF bandwidth, i.e. the bandwidth in which the multi carrier base station 10 receives multiple carriers, and the maximum bandwidth which is supported by the multi carrier base station 10. Furthermore, the multi carrier base station 10 may comprise a processor 90 which is adapted to control the operation of the multi carrier base station 10.

With reference to FIG. 5a, which is a schematic block diagram, a heterodyne receiver 50 will now be described in accordance with one exemplifying embodiment. The heterodyne receiver corresponds to the heterodyne receiver disclosed in some other exemplifying embodiment and the same reference number is therefore applied.

The heterodyne receiver 50 comprises a first mixer 500, an RF (Radio Frequency) LO (Local oscillator) 502, a first IF (Intermediate Frequency) filter 504, a second mixer 506, an IF LO (Local Oscillator) 508, a second IF-filter 510, and an A/D-converter 512. The RF mixer 500 is arranged to receive an RF-signal from a UE on a first input, via an antenna 70. On a second input of the RF mixer 500, it is arranged to receive an output of the RF LO. The RF mixer 500 is arranged to convert the received RF-signal down into an IF-version of the received RF-signal. The first IF-filter 504 is a bandpass filter arranged to let the data part of the IF-version pass, i.e. the edges of the first IF-filter 504 are selected to enable the filter to remove the interference part of the IF-version of the received RF-signal.

The IF mixer 506 is arranged to receive the output signal of the first IF-filter 504 on a first input, and to receive an output signal of the IF LO 508 on a second input. The IF mixer 506 is further arranged to mix these two output signals, which results in a further converted second IF-version of the received RF-signal. The second IF-filter 510 is arranged to let the data part of the second IF-version pass. The resulting signal from the second IF-filter 510 will be fed to the A/D-converter 512, which converts the received signal into a base band signal of the heterodyne receiver. In this exemplifying embodiment, both the RF LO 502 and the IF LO are provided with respective shift control inputs, which are feeding control signals from a shift control unit to adjust the output frequency of the respective RF LO 502, and IF LO 508. As will be described in another exemplifying embodiment below, the output of the RF LO 502 and the output of the IF LO 508 will be frequency shifted to enable the first IF filter 504 and the second IF filter 510 to remove the interference part(s).

The heterodyne receiver 50 may in optionally further comprise an AA (anti-aliasing) filter 512, arranged to remove possible remaining aliases of the second IF-version of the received RF-signal. The AA-filter 522 is implemented as a lowpass filter which lets the second IF-version pass In an alternative exemplifying which is based on the one described above, the heterodyne receiver may further comprise an AA (Anti-aliasing filter) 522 which is arranged at the output from the second IF-filter 510. The AA-filter 522 is implemented as a lowpass-filter. However, the disclosed concept is not limited thereto, and alternatively the function of the AA-filter 522 may be integrated in the second IF-filter 510. With reference to FIG. 5b, which is a schematic block diagram, an interference receiver unit 30 will now be described in accordance with one exemplifying embodiment.

The interference receiver unit 30 is arranged to detect an interference part of a received RF-signal. The interference receiver unit 30 is an exemplifying embodiment of the interference receiver unit described with reference to FIG. 4, and therefore the same reference numbers have been used when appropriate.

The interference receiver unit 30 comprises an interference mixer 530, an interference LO 532, an A/D-converter 534, and a frequency converter 536. As disclosed in another exemplifying embodiment, an RF-signal comprising a data part and an interference part is received simultaneously at the interference receiver unit 30 and at a heterodyne receiver unit 50. In the interference receiver unit 30, the RF-signal is fed to a first input of an interference mixer 530. The interference mixer 530 is further arranged to receive an output of the interference LO 532 on another input. The interference mixer 530 is arranged to mix the inputs and to output a down-converted version of the RF-signal, into an IF version of the RF-signal. The A/D-converter 534 is adapted to convert this IF version into a digital IF-signal. The frequency converter 536 is arranged to convert the digital IF-signal into a frequency domain before feeding it to the notch filter 40, which is disclosed in another exemplifying embodiment.

It is to be noted that the figures in this disclosure are schematically illustrated and that arrangements typically comprise further components to operate properly, e.g. some filters, amplifiers, processing units, memories, etc. However, any such units and components which are not necessary for the understanding of the disclosed concept have been omitted in the figures. For instance, the heterodyne receiver unit 50 may typically comprise an LNA (Low noise amplifier). Furthermore, the heterodyne receiver unit 50 may comprise a receiving unit adapted to delay the received RF-signal to be processed.

Figure 6:
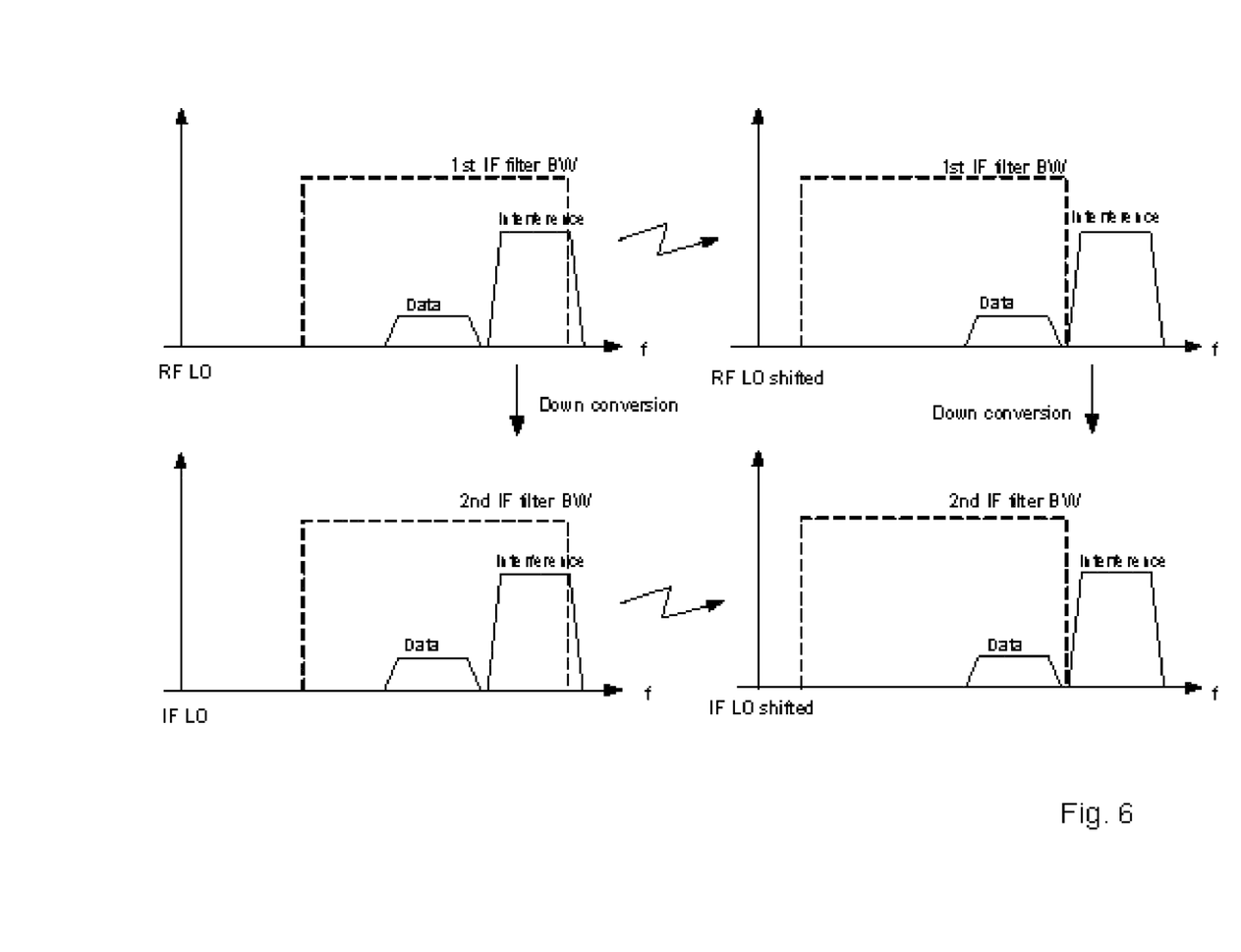
FIG. 6 is a set of schematic graphs of situations in a multi carrier receiving entity, according to possible embodiments.

With reference to FIG. 6, which is divided in four schematic graphs, some intermediate situations in a multi carrier receiving entity will now be described in accordance with two exemplifying embodiments.

In the upper left graph, a data part of a received RF-signal and an interference part of the received RF-signal are illustrated. Compared with FIG. 5a, the FIG. 6 illustrates the situation at the first input of the RF-mixer 500 when the RF LO 502 is fixed, i.e. when the output of the RF-mixer is not frequency shifted. Illustrated is also the BW (bandwidth) of a first IF-filter. As seen in this graph, the first IF-filter will not be enabled to separate the data part from the interference part when filtering the received RF-signal after being frequency converted down to a first IF (Intermediate Frequency) range. Thus, the upper left graph illustrates the situation for an ordinary heterodyne receiver.

The upper right graph illustrates the situation when the output frequency of the RF LO 502 instead is decreased in relation to a standard output of the RF LO 502, and the output of the RF-mixer 500 is frequency shifted towards an upper edge of the first IF-filter. The blitz-arrow illustrates the frequency shifting. As seen, the first IF-filter will be enabled to separate the data part from the interference part when filtering, i.e. the upper right graph illustrates the situation for a heterodyne receiver according to one exemplifying embodiment.

However, a heterodyne receiver may be implemented differently within the disclosed concept, which will now be described in accordance with an alternative exemplifying embodiment.

The lower left graph illustrates a situation where the received data part and interference part have been frequency converted into the first IF-range. Furthermore, the BW of the second IF-filter 510 is illustrated in the graph. This situation occurs when the output frequency of the IF LO 508 is fixed. As seen, the second IF-filter 510 will not be enabled to separate the data part of from the interference part when filtering. The second IF-filter 510 filters the output of the IF-mixer 506, i.e. a second IF-version of the RF-signal. Thus, also the lower left graph illustrates the situation for an ordinary heterodyne receiver.

The lower right graph illustrates also a situation where the received data part and interference part have been frequency converted into the first IF-range. However, in this situation the output of the IF LO 508 is decreased in relation to a standard frequency of the IF LO 508, and the output of the IF-mixer 506 is thereby frequency shifted towards the upper edge of the second IF-filter 510. As seen, the second IF-filter 510 will be enabled to separate the data part from the interference part when filtering output of the IF-mixer 506.

Thus, by adjusting the output frequency of at least one local oscillator in relation to its standard output frequency, the heterodyne receivers according to the described exemplifying embodiments will be enabled to exclude interference parts from the passband of the corresponding IF-filter. Thereby, the interference parts could be removed when filtering and will not affect the receivers, which improves operation conditions of the receivers.

Figure 7:
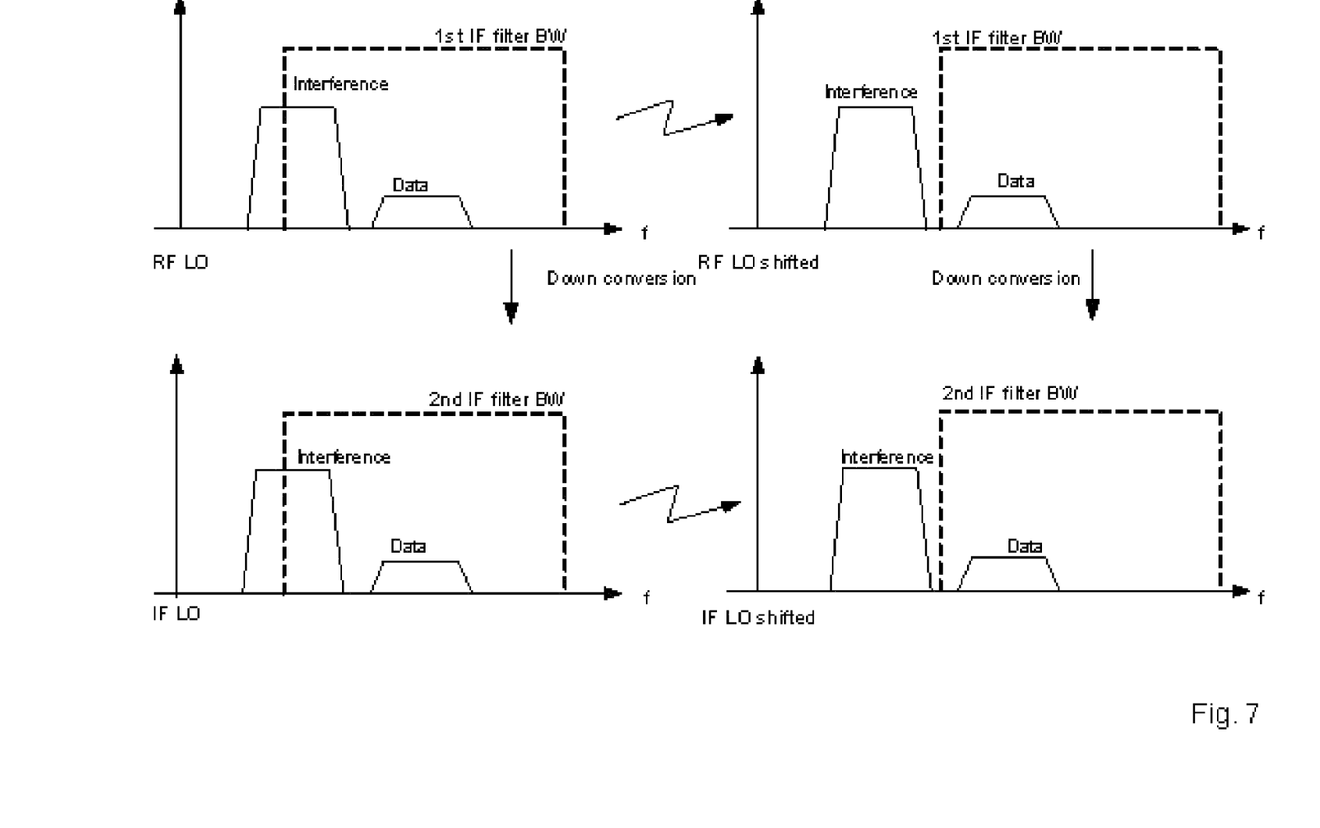
FIG. 7 is a set of schematic graphs of situations in a multi carrier receiving entity, according to possible embodiments.

With reference to FIG. 7, which is divided in four schematic graphs, some intermediate situations in a multi carrier receiving entity will now be described in accordance with two exemplifying embodiments.

These exemplifying embodiments are similar to the exemplifying embodiments described above, and differ in that the frequency spectrum of the interference part instead is below the frequency spectrum of the data part. Thus, these exemplifying embodiments will only be briefly described.

Similarly, to in the exemplifying embodiments described above, the output of the RF LO 502 and the output of the IF LO 508 are fixed and the first IF-filter 504 and the second IF-filter 510 will not be enabled to separate the data parts from the interference parts in the respective first and second frequency converted versions of the RF-signal, which is illustrated in the upper left graph and in the lower left graph.

The situation which is illustrated in the upper right graph differs from the corresponding graph of FIG. 6 in that the frequency spectrum of the interference part is below the frequency spectrum of the data part. By instead decreasing the output frequency of the RF LO 502, the first frequency converted IF-version of the received RF-signal will be frequency shifted towards a lower edge of the first IF-filter 504, and the first IF-filter 504 will be enabled to separate and remove the data part from the interference part. Correspondingly, as illustrated in the lower right graph, by instead decreasing the output frequency of the IF LO 508, the second frequency converted IF-version of the received RF-signal will be frequency shifted towards a lower edge of the second IF-filter 510, and the second IF-filter 510 will be enabled to separate and remove the data part from the interference part.

Figure 8:
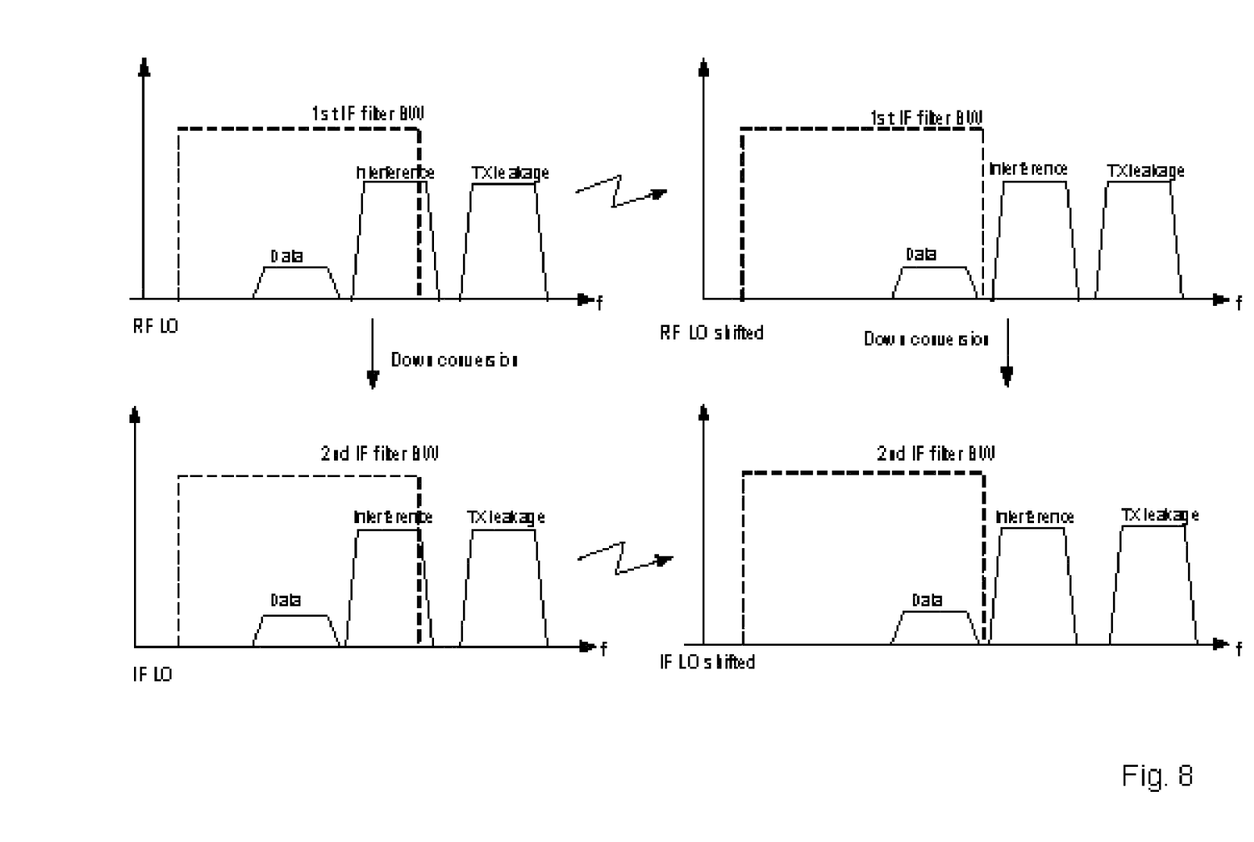
FIG. 8 is a set of schematic graphs of situations in a multi carrier receiving entity, according to possible embodiments.

With reference to FIG. 8, which is divided in four schematic graphs, some intermediate situations in a multi carrier receiving entity will now be described in accordance with two exemplifying embodiments.

The situations according to the four graphs differ from the corresponding situations described with reference to FIG. 6 in that the multi carrier receiver is further affected by TX (Transmitter) leakage from the multi carrier receiver itself. Besides these differences which will be described, these exemplifying embodiments will not be necessary to disclose further.

As seen in the two left graphs, where the output frequencies of the RF LO 502 and the IF LO 508 are fixed, the first IF filter 504 and the second IF filter 510 will not be able to separate any of the interference parts or the TX leakage.

Similarly, as disclosed with reference to FIG. 6, in the two right graphs, when adjusting the output of at least one of the RF LO 502 and the IF LO 508, the outputs of the respective of the RF mixer 500 and the IF mixer 506 will be frequency shifted towards the upper edge of the passband of the first IF filter 504 and the second IF filter 510. Then interference part as well as the TX leakage will be able to separate for the first IF filter 504 and the second IF filter 510.

Figure 9:
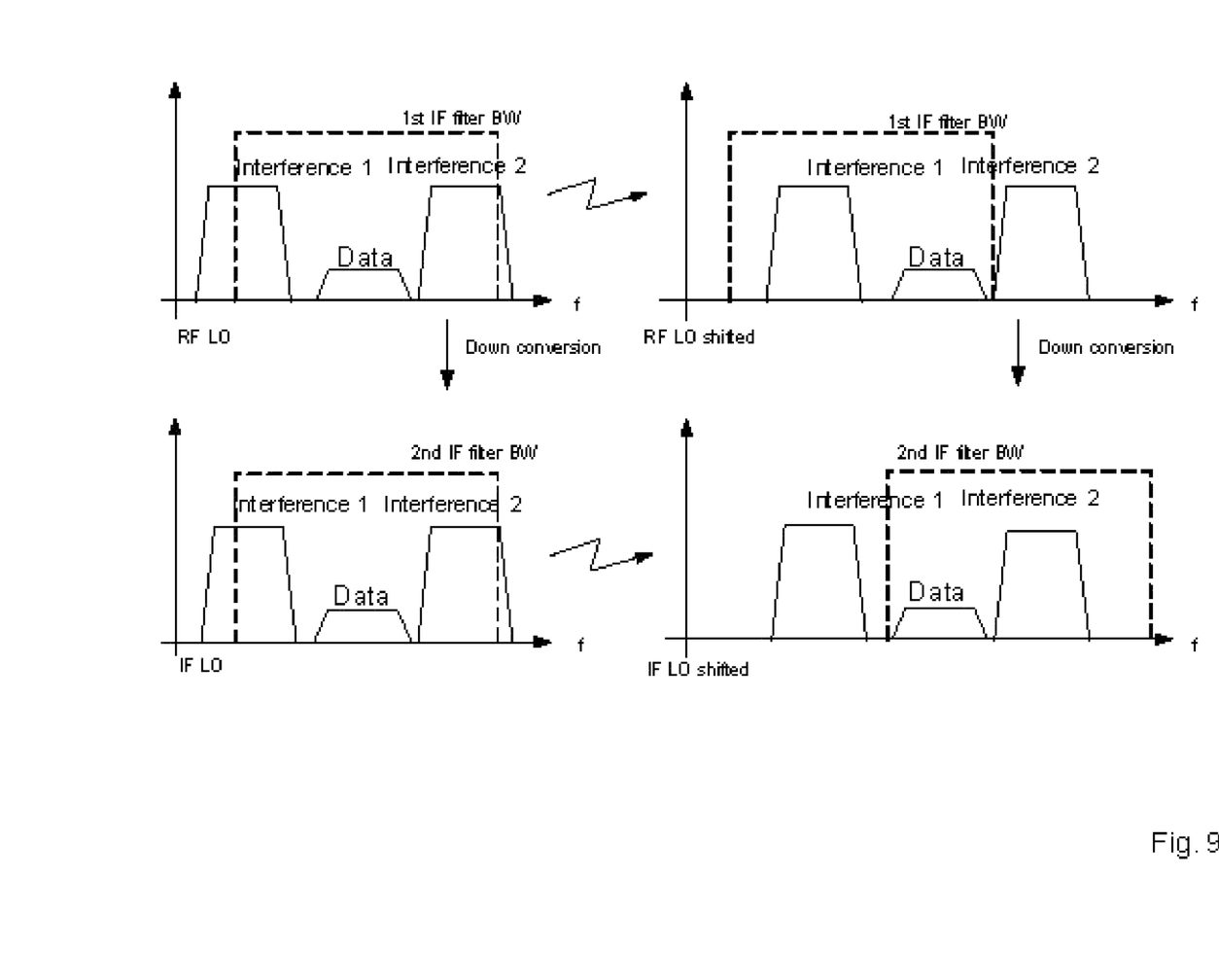
FIG. 9 is a set of schematic graphs of situations in a multi carrier receiving entity, according to possible embodiments.

With reference to FIG. 9, which is divided in four schematic graphs, some intermediate situations in a multi carrier receiving entity will now be described in accordance with two exemplifying embodiments.

The situations according to the four graphs differ from the corresponding situations described with reference to FIG. 6 in that the multi carrier receiver is further affected by a second interference part, where the frequency spectrum of the first interference part is below the frequency spectrum of the data part and the frequency part of the second interference part is above the frequency spectrum of the data part.

As seen in the two left graphs, where the output frequencies of the RF LO 502 and the IF LO 508 are fixed, neither the first IF filter 504, nor the second IF filter 510 will be enabled to separate any of the two interference parts from the data part. However, as seen in the upper right graph, when the output frequency of the RF LO 502 is increased in relation to the standard output frequency of the RF LO 502, the output signal of the RF mixer 500 will be frequency shifted towards an upper edge of the passband of the first IF filter 504. The first IF filter 504 will then be enabled to separate the second interference part from the remaining part, i.e. the data part and the first interference part, when filtering.

Correspondingly, as seen in the lower right graph, when the output frequency of the IF LO 508 is decreased in relation to the standard output frequency of the IF LO 508, the output signal of the IF mixer 506 will be frequency shifted towards a lower edge of the passband of the second IF filter 510. The second IF filter 510 will then be enabled to separate the first interference part from the data part when filtering.

Alternatively, by instead decreasing the output frequency of the RF LO 502 and increasing the output frequency of the IF LO 508, the outputs of the RF mixer 500 and the IF mixer 506 will be frequency shifted such that the first IF filter 504 removes the first interference part and the second IF filter 510 removes the second interference part.

Thus, by increasing, in a heterodyne receiver which uses double conversion, the output frequency of an RF LO and decreasing the output frequency of an IF LO, the first IF filter 504 and the second IF filter will be enabled to separate a data part from an surrounding interference parts of as well higher and lower frequency spectrums than the data part.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a multi carrier receiving entity for reception of a Radio frequency (RF) signal, said multi carrier receiving entity comprising a heterodyne receiver unit with a first mixer, a first Local Oscillator (LO) and a first Intermediate Frequency (IF) bandpass filter, said method comprising:
   receiving, by means of a heterodyne receiver unit and by means of an interference receiver unit, the RF signal from a transmitting entity, the RF signal comprising a data part and an interference part;
   detecting the interference part by means of the interference receiver unit, and determining a frequency and a power level of the interference part; and
   adjusting a frequency of the first LO, such that an output signal of the first mixer is frequency shifted towards an upper edge or a lower edge of the first IF bandpass filter, when the determined power level exceeds a predetermined threshold.

2. The method according to claim 1, wherein the interference part of the RF signal is detected by:
   mixing, by means of the interference receiver unit, the received RF signal with a frequency of an interference receiver LO;
   converting a resulting signal of the mixing into a frequency domain; and
   filtering the converted signal by a notch filter, such that the data part is excluded from the interference part.

3. The method according to claim 2, wherein the heterodyne receiver structure further comprises a second mixer, a second LO, and a second IF bandpass filter, and a frequency of the second LO is adjusted such that the data part of the output of the second mixer is shifted towards an upper edge or a lower edge of the second IF bandpass filter when the determined power level exceeds the predetermined threshold.

4. The method according to claim 3, wherein the first LO is an RF LO, the first mixer is an RF mixer, the second mixer is an IF mixer, and the second LO is an IF LO.

5. The method according to claim 3, wherein:
decreasing the frequency of the first LO such that the output signal of the first mixer is frequency shifted towards the lower edge of the first IF bandpass filter, and the frequency of the second LO is increased such that the output signal of the second mixer is frequency shifted towards the upper edge of the second IF bandpass filter, or
increasing the frequency of the first LO such that the output signal of the first mixer is frequency shifted towards the upper edge of the first IF bandpass filter, and the frequency of the second LO is decreased such that the output signal of the second mixer is frequency shifted towards the lower edge of the passband of the second filter.

6. The method according to claim 3, wherein at least one of the frequency of the first LO and the frequency of the second LO is adjusted when the average power of the detected interference exceeds the predetermined threshold during the predetermined time period.

7. The method according to claim 1, wherein the heterodyne receiver structure further comprises a second mixer, a second LO, and a second IF bandpass filter, and a frequency of the second LO is adjusted such that the data part of the output of the second mixer is shifted towards an upper edge or a lower edge of the second IF bandpass filter, when the determined power level exceeds the predetermined threshold.

8. The method according to claim 7, wherein the first LO is an RF LO, the first mixer is an RF mixer, the second mixer is an IF mixer, and the second LO is an IF LO.

9. The method according claim 7, further comprising:
decreasing the frequency of the first LO such that the output signal of the first mixer is frequency shifted towards the lower edge of the first IF bandpass filter, and the frequency of the second LO is increased such that the output signal of the second mixer is frequency shifted towards the upper edge of the second IF bandpass filter, or
increasing the frequency of the first LO such that the output signal of the first mixer is frequency shifted towards the upper edge of the first IF bandpass filter, and the frequency of the second LO is decreased such that the output signal of the second mixer is frequency shifted towards the lower edge of the passband of the second filter.

10. The method according to claim 7, wherein at least one of the frequency of the first LO and the frequency of the second LO is adjusted when the average power of the detected interference exceeds the predetermined threshold during the predetermined time period.

11. The method according to claim 1, wherein the frequency of the first LO is adjusted when an average power of the detected interference exceeds a predetermined threshold during a predetermined time period.

12. A multi carrier receiving entity for reception of a Radio frequency (RF) signal, said multi carrier receiving entity comprising a heterodyne receiver unit with a first mixer, a first Local Oscillator (LO) and a first Intermediate Frequency (IF) bandpass filter, the multi carrier receiving entity further comprising:

an interference receiving unit;
the heterodyne receiver unit and the interference receiving unit being both configured to receive the RF signal from a transmitting entity, the RF signal comprising a data part and an interference part; and
the interference receiving unit being further configured to detect the interference part and determining a power level and a frequency of the interference part, and the multi carrier receiving entity is further configured to adjust a frequency of the first LO when the determined power level exceeds the predetermined threshold, such that an output signal of the first mixer is frequency shifted towards an upper edge or a lower edge of the first IF bandpass filter.

13. The multi carrier receiving entity according to claim 12, further comprising a notch filter, and wherein the multi carrier receiving entity is further configured to detect the interference part by:
mixing, by means of the interference receiver unit, the received RF signal with a frequency of an interference receiver LO, the interference receiver LO being comprised in the interference receiver unit;
converting, by means of the interference receiver unit the resulting signal of the mixing into a frequency domain; and
filtering the frequency domain by the notch filter such that the data part is excluded from the interference part.

14. The multicarrier receiving entity according to claim 13, wherein the heterodyne receiver structure further comprises a second mixer, a second LO, and a second IF bandpass filter, and is further configured to adjust a frequency of the second LO such that an output of the second mixer is shifted towards an upper edge or a lower edge of the second IF bandpass filter when the determined power level exceeds the predetermined threshold.

15. The multi carrier receiving entity according to claim 14, wherein the first LO is an RF LO, the first mixer is an RF mixer, the second mixer is an IF mixer, and the second LO is an IF LO.

16. The multicarrier receiving entity according to claim 14, further configured to:
decrease the frequency of the first LO such that the output signal of the first mixer is frequency shifted towards the lower edge of the first IF bandpass filter, and increase the frequency of the second LO such that the output signal of the second mixer is frequency shifted towards the upper edge of the second IF bandpass filter, or
increase the frequency of the first LO such that the output signal of the first mixer is frequency shifted towards the upper edge of the first IF bandpass filter, and decrease the frequency of the second LO such that the output signal of the second mixer is frequency shifted towards the lower edge of the second IF bandpass filter.

17. The multi carrier receiving entity according to claim 14, further configured to adjust at least one of the frequency of the first LO and the frequency of the second LO when the average power of the detected interference exceeds the predetermined threshold during the predetermined time period.

18. The multi carrier receiving entity according to claim 12, wherein the heterodyne receiver structure further comprises a second mixer, a second LO, and a second IF bandpass filter, and is further configured to adjust a frequency of the second LO such that an output of the second mixer is shifted towards an upper edge or a lower edge of the second IF bandpass filter when the determined power level exceeds the predetermined threshold.

19. The multi carrier receiving entity according to claim 18, wherein the first LO is an RF LO, the first mixer is an RF mixer, the second mixer is an IF mixer, and the second LO is an IF LO.

20. The multi carrier receiving entity according claim 18, further configured to:
- decrease the frequency of the first LO such that the output signal of the first mixer is frequency shifted towards the lower edge of the first IF bandpass filter, and increase the frequency of the second LO such that the output signal of the second mixer is frequency shifted towards the upper edge of the second IF bandpass filter, or
- increase the frequency of the first LO such that the output signal of the first mixer is frequency shifted towards the upper edge of the first IF bandpass filter, and decrease the frequency of the second LO such that the output signal of the second mixer is frequency shifted towards the lower edge of the second IF bandpass filter.

21. The multi carrier receiving entity according to claim 18, further configured to adjust at least one of the frequency of the first LO and the frequency of the second LO when the average power of the detected interference exceeds the predetermined threshold during the predetermined time period.

22. The multi carrier receiving entity according to claim 12, further configured to adjust the frequency of the first LO when an average power of the detected interference exceeds a predetermined threshold during a predetermined time period.

* * * * *